(12) United States Patent
Lin et al.

(10) Patent No.: US 9,152,751 B2
(45) Date of Patent: Oct. 6, 2015

(54) METAL LINES FOR PREVENTING AC ELECTROMIGRATION

(71) Applicant: TAIWAN SEMICONDUCTOR MANUFACTURING CO., LTD., Hsinchu (TW)

(72) Inventors: Chin-Shen Lin, Taipei (TW); Jerry Chang-Jui Kao, Taipei (TW); Nitesh Katta, Hsinchu (TW); Chou-Kun Lin, Hsin-Chu (TW); Yi-Chuin Tsai, Sing-Yuan (TW); Chien-Ju Chao, New Taipei (TW); Kuo-Nan Yang, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/267,537

(22) Filed: May 1, 2014

(65) Prior Publication Data

US 2015/0095873 A1    Apr. 2, 2015

Related U.S. Application Data

(60) Provisional application No. 61/884,516, filed on Sep. 30, 2013.

(51) Int. Cl.
G06F 17/50 (2006.01)
(52) U.S. Cl.
CPC ............................ *G06F 17/5045* (2013.01)

(58) Field of Classification Search
CPC .................................................. G06F 17/5045
USPC .......................................................... 716/136
See application file for complete search history.

(56) References Cited

U.S. PATENT DOCUMENTS

| 5,737,580 | A  | * | 4/1998  | Hathaway et al. | ............ 716/115 |
| 6,493,859 | B1 | * | 12/2002 | Gould et al. | ................... 716/127 |
| 8,209,651 | B2 | * | 6/2012  | Yokogawa et al. | ........... 716/112 |
| 8,694,933 | B2 | * | 4/2014  | Gopalakrishnan et al. | ... 716/106 |

* cited by examiner

*Primary Examiner* — Jack Chiang
*Assistant Examiner* — Brandon Bowers
(74) *Attorney, Agent, or Firm* — McDermott Will & Emery LLP (57) ABSTRACT

A method is disclosed that includes the operations outlined below. An effective current pulse width of a maximum peak is determined based on a waveform function of a current having multiple peaks within a waveform period in a metal segment of a metal line in at least one design file of a semiconductor device to compute a duty ratio between the effective current pulse width and the waveform period. A maximum direct current limit of the metal segment is determined according to physical characteristics of the metal segment. An alternating current electromigration (AC EM) current limit is determined according to a ratio between the maximum direct current limit and a function of the duty ratio. The metal segment is included with the physical characteristics in the at least one design file when the maximum peak of the current does not exceed the AC EM current limit.

21 Claims, 8 Drawing Sheets

METAL LINES FOR PREVENTING AC ELECTROMIGRATION

PRIORITY CLAIM

This application claims priority to U.S. Application Ser. No. 61/884,516, filed Sep. 30, 2013, which is herein incorporated by reference.

BACKGROUND

Electromigration is the transport of material caused by the gradual movement of the ions in a conductor due to the momentum transfer between conducting electrons and diffusing metal atoms. The effect appears in applications where high current pulses are generated, such as in microelectronics and related structures. As the structure size in electronics such as integrated circuits (ICs) decreases, the effect becomes more apparent.

BRIEF DESCRIPTION OF THE DRAWINGS

The disclosure can be more fully understood by reading the following detailed description of various embodiments, with reference to the accompanying drawings as follows.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
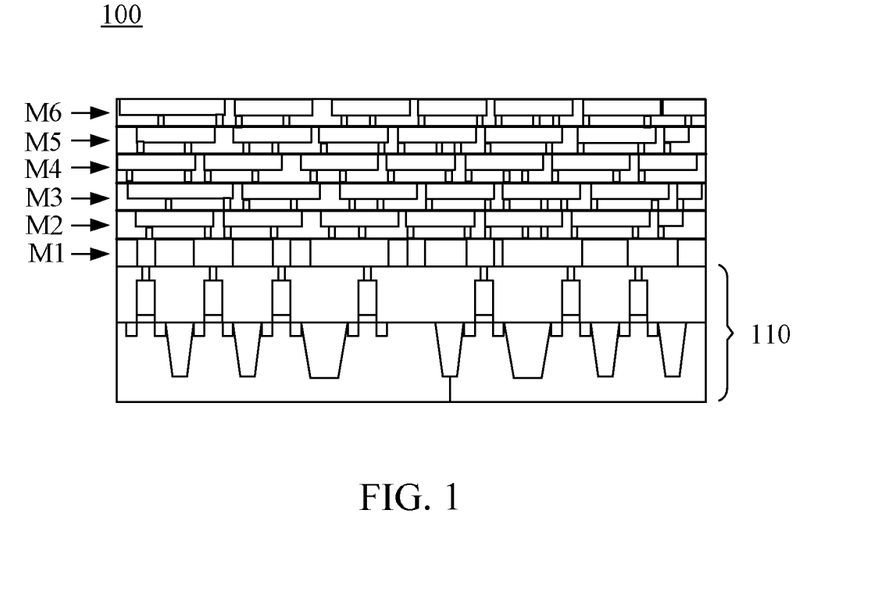
FIG. 1 is a schematic diagram of a semiconductor device in accordance with various embodiments of the present disclosure.

FIG. 1 is a schematic diagram of a semiconductor device 100 in accordance with various embodiments of the present disclosure. The semiconductor device 100 includes a device portion 110 and a plurality of metal layers M1-M6.

In some embodiments, the metal layers M1-M6 are formed on the device portion 110 and are connected to the device portion 110. The metal layers M1-M6 include a plurality of metal lines (not labeled) to connect different integrated circuit (IC) components (not labeled) in the device portion 110 together.

Figure 2:
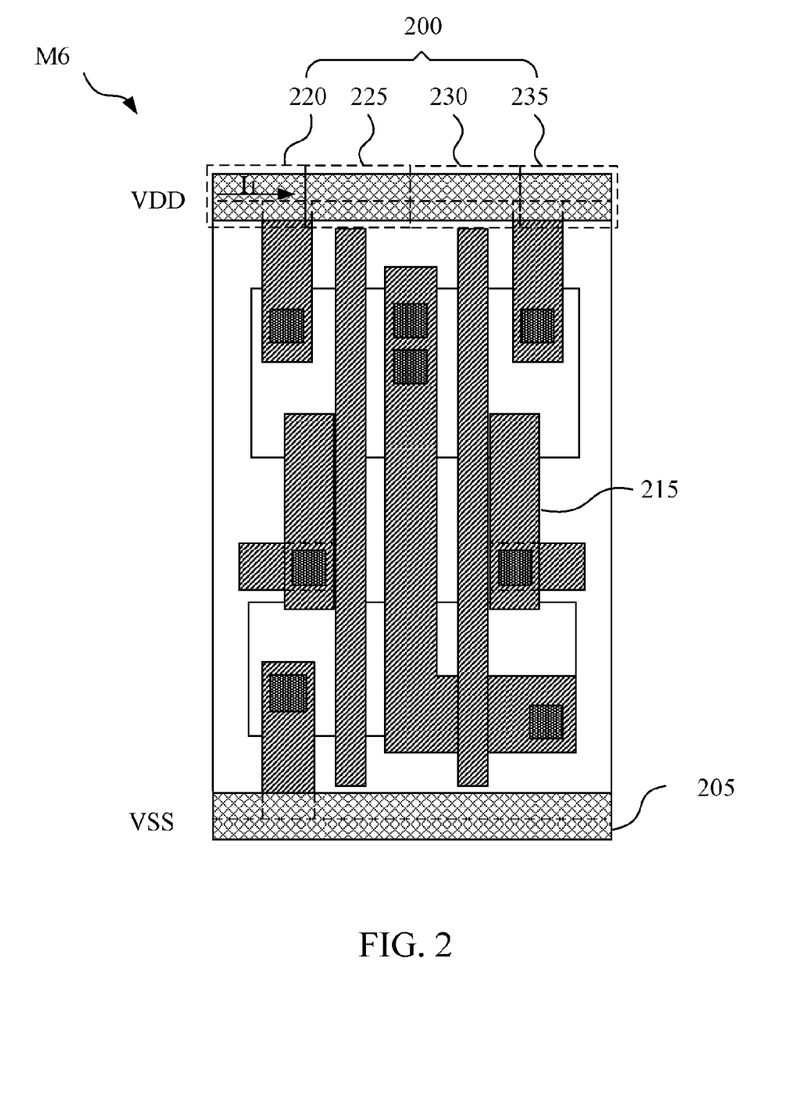
FIG. 2 is an exemplary diagram of a partial top view of the metal layer in FIG. 1, in accordance with various embodiments of the present disclosure.

FIG. 2 is an exemplary diagram of a partial top view of the metal layer M6 in FIG. 1, in accordance with various embodiments of the present disclosure.

For illustration in FIG. 2, the metal layer M6 includes metal lines 200, 205 and 215. In some embodiments, the metal lines 200 and 205 are power rails connected to a power supply VDD and a ground terminal VSS respectively for providing power to the IC components of the device portion 110 in the semiconductor device 100 depicted in FIG. 1. In some embodiments, the metal lines 215 are signal lines for transmitting signals, between different IC components of the device portion 110. In further embodiments, the metal lines 215 transmit data signals or clock signals between different IC components of the device portion 110.

Each of the metal lines 200, 205 and 215 includes a plurality of metal segments, such as the metal segments 220, 225, 230 and 235 of the metal line 200. Each of the metal segments 220, 225, 230 and 235 is formed with physical characteristics that contribute a maximum direct current limit Ipeak_dc. In some embodiments, the physical characteristics include a geometry and a type of the metal segments 220, 225, 230 and 235. The geometry includes the width and the length of each of the metal segments 220, 225, 230 and 235. The type of the metal segments 220, 225, 230 and 235 includes, but not limited to, different material such as copper, silver and gold, etc. The physical characteristics of the metal segments 220, 225, 230 and 235 determine the maximum current, i.e., the maximum direct current limit Ipeak_dc, that is allowable to flow therethrough. In some embodiments, the maximum direct current limit Ipeak_dc is a polynomial function of the width and the length for each different type of metal of the metal segments 220, 225, 230 and 235.

Each of the metal segments 220, 225, 230 and 235 further transmits a current including a current pulse having multiple peaks, such as the current I1 flowing through the metal segment 220.

Figure 3A:
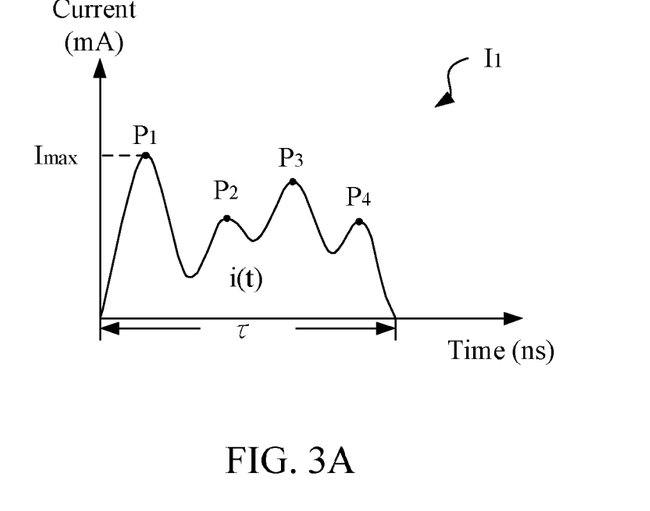
FIG. 3A is an exemplary diagram of the waveform of current that flows through the metal segment in accordance with various embodiments of the present disclosure.

FIG. 3A is an exemplary diagram of the waveform of current I1 that flows through the metal segment 220 in accordance with various embodiments of the present disclosure. As illustrated in FIG. 3A, the horizontal axis stands for the time in units of nano seconds (ns), and the vertical axis stands for the amount of the current in units of milliamperes (mA).

The current I1 includes four peaks P1, P2, P3 and P4 within a waveform period $\tau$, in which the maximum peak P1 has a maximum current amount Imax. In some embodiments, the duration of the waveform period $\tau$ is determined according to an operating frequency of a circuitry to which the metal line 200 is connected.

The waveform of the current I1 is described by a waveform function i(t). An effective current pulse width tD_eff of the current I1 is determined based on the waveform function i(t) within the waveform period $\tau$.

Figure 3B:
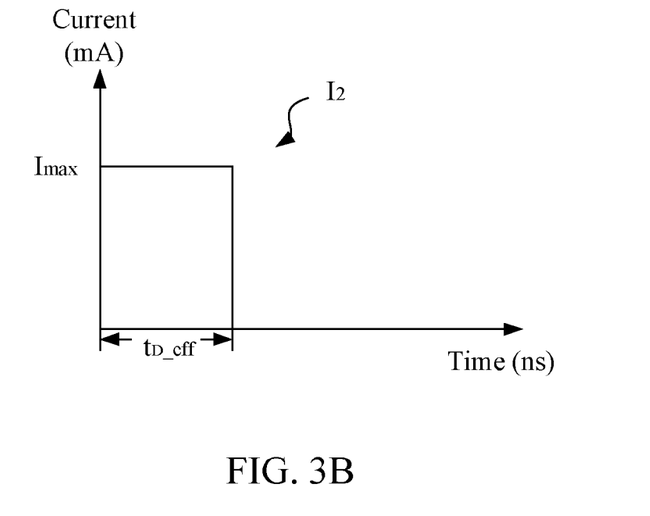
FIG. 3B is an exemplary diagram of the waveform of current, which is a square wave in accordance with various embodiments of the present disclosure.

FIG. 3B is an exemplary diagram of the waveform of current I2, which is a square wave in accordance with various embodiments of the present disclosure.

The waveform of current I2 has a current value equivalent to the maximum current amount Imax and a pulse width equivalent to the effective current pulse width tD_eff. In some embodiments, the current I1 has an effect on the metal segment 220, similar to the effect that the current I2 has on the metal segment 220. Explained in a different way, an amount of a quantized characteristic of the current I1 is similar to that of the current I2. Therefore, when the current I1 flows through the metal segment 220, the current I1 has an effect on the metal atoms in the metal segment 220, that is similar to the effect on the metal atoms, which is generated when the current I2 flows through the metal segment 220. In some embodiments, the quantized characteristic indicates the total amount of the electric charges that the current I1 or I2 carries, or the total energy that the current I1 or I2 has.

A duty ratio r is further computed between the effective current pulse width tD_eff and the waveform period $\tau$. In some embodiments, the duty ratio r is described by the following equation:

$$r = tD\_eff/\tau$$

An alternating current electromigration (AC EM) current limit Ipeak,limit is determined according to a ratio between the maximum direct current limit Ipeak_dc of the metal segment 220 and a function of the duty ratio r. In some embodiments, the function of the duty ratio r is a power function of the duty ratio r, and the AC EM current limit Ipeak,limit is described by the following equation:

$$Ipeak,limit = Ipeak\_dc/r^n, \text{ where } n \text{ is a real number.}$$

The metal segment 220 is formed such that the maximum peak P1 corresponding to the current pulse having the maximum current amount Imax in the current I1 does not exceed the AC EM current limit Ipeak,limit.

In some approaches, the maximum direct current limit Ipeak_dc is configured as the peak EM limit. Under such condition, a stricter AC EM rule is applied, since in these approachs the current I1 is treated as a square wave pulse having the current value of Ipeak_dc within the waveform period $\tau$.

In the approach described above, the calculation of the effective current pulse width tD_eff and the duty ratio r allows the metal segment 220 to be formed with a more relaxed AC EM rule by using the AC EM current limit Ipeak,limit that reflects the practical effect of the current on the metal segments 220, 225, 230 and 235. Therefore, the metal segment 220 is formed to prevent the occurrence of electromigration generated by the inrush current pulses with a more relaxed AC EM rule.

In some embodiments, each of the metal segments 225, 230 and 235 is formed with the same method described above according to their own current condition. When the metal segments 220, 225, 230 and 235 are formed, the whole metal line 200 is formed.

Figure 4:
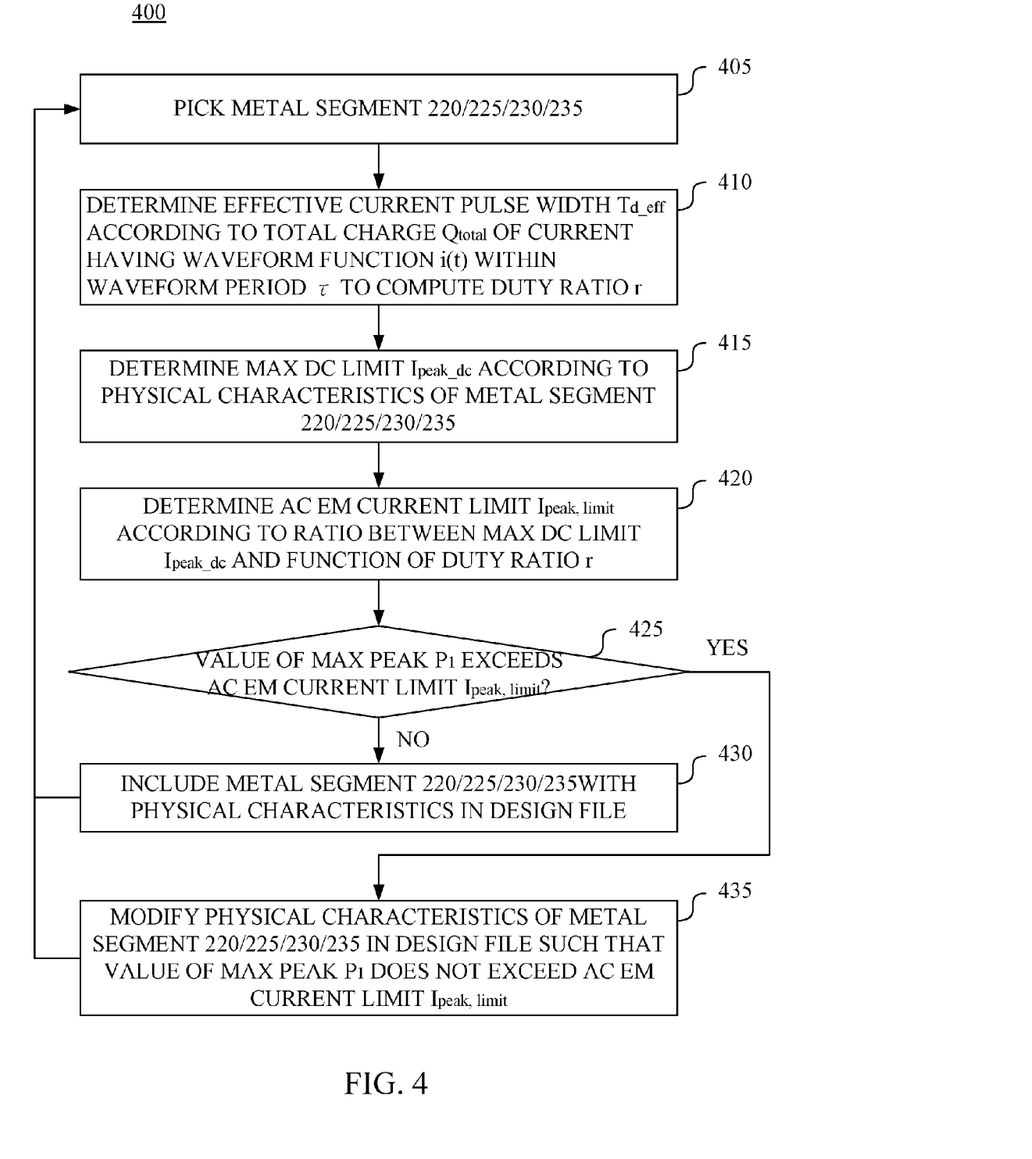
FIG. 4 is a flow chart of a method illustrating the process of forming the metal line in FIG. 2, in accordance with various embodiments of the present disclosure.

FIG. 4 is a flow chart of a method 400 illustrating the process of forming the metal line 200 in FIG. 2, in accordance with various embodiments of the present disclosure.

For illustration, the formation of the metal lines 200 in FIG. 2 is described by the method 400 with reference to FIGS. 3A-3B.

In operation 405, the metal segment 220 of the metal line 200 in at least one design file of the semiconductor device 100 is picked.

In operation 410, the effective current pulse width tD_eff is determined according to the total charge Qtotal of the current I1 based on an integration of the waveform function i(t) over time within the waveform period $\tau$ to compute the duty ratio r.

In some embodiments, the total charge Qtotal is calculated based on an integration of the waveform function i(t) over time and is expressed as:

$$Q_{total} = \int_0^\tau |i(t)| \cdot dt$$

The effective current Ieff and the relation between the maximum current amount Imax and the effective current pulse width tD_eff are found:

$$I_{eff} = \int_0^\tau |i(t)| \cdot dt/\tau = I_{max} \times (\int_0^\tau |i(t)| \cdot dt/I_{max})/\tau = I_{max} \times (t_{D\_eff})/\tau$$

The effective current pulse width tD_eff is derived by dividing the total charge Qtotal by the value Imax of the maximum peak P1 of the current:

$$t_{D\_eff} = \int_0^\tau |i(t)| \cdot dt/I_{max}$$

As illustrated above, the method is based on the conservation of the electrical charges between the currents I1 and I2. Under such condition, the total area under the waveform of the current I1 in FIG. 3A is the same as the total area under the waveform of the current I2 in FIG. 3B. The amount of the total electrical charges that flow through the metal segment 220 in the current I1 within period $\tau$ is the same as the amount of the total electrical charges that flow through the metal segment 220 in the current I2 within period $\tau$.

Therefore, when the current I1 flows through the metal segment 220, the current I1 has an effect on the metal atoms in the metal segment 220 similar to the effect generated when the current I2 flows through the metal segment 220.

The duty ratio r is further computed by dividing the effective current pulse width tD_eff by the waveform period $\tau$.

In operation 415, the maximum direct current limit Ipeak_dc of the metal segment 220 is determined according to the physical characteristics of the metal segment 220.

In operation 420, the AC EM current limit Ipeak,limit is determined according to a ratio between the maximum direct current limit Ipeak_dc and a function of the duty ratio r. In some embodiments, the AC EM current limit Ipeak,limit is described by the following equation:

$I\text{peak,limit}=I\text{peak\_dc}/r^n$, where $n$ is a real number.

In operation 425, whether the value Imax of the maximum peak P1 exceeds the AC EM current limit Ipeak, limit is determined.

In operation 430, the metal segment 220 is included in the at least one design file with the physical characteristics when the value Imax of the maximum peak P1 does not exceed the AC EM current limit Ipeak, limit.

In operation 435, the physical characteristics of the metal segment 220 in the at least one design file are modified when the value Imax of the maximum peak P1 exceeds the AC EM current limit Ipeak, limit. As a result, the value Imax of the maximum peak P1 does not exceed the AC EM current limit Ipeak, limit and the modified metal segment 200 is included in the at least one design file after the modification. In some embodiments, the operations 410, 415, 420, 425 are used to determine whether the modified metal segment 220 satisfies the requirement.

The next metal segment 225 is picked in operation 405 after the operation 430 or 435 to repeat the above operations, until all the metal segments 220, 225, 230 and 235 in the metal lines 200 are included.

Further, the semiconductor device 100 is fabricated according to the at least one design file.

Based on the operations 405-435, the metal segments 220, 225, 230 and 235 of the metal line 200 are formed according to the AC EM current limit Ipeak, limit. The AC EM current limit Ipeak, limit is calculated by dividing maximum direct current limit Ipeak_dc by the function of the duty ratio instead of using the maximum direct current limit Ipeak_dc directly. The duty ratio is determined based on the effective current pulse width tD_eff derived according to the conservation of the electrical charges. The AC EM current limit Ipeak, limit reflects the practical effect of the current on the metal segments 220, 225, 230 and 235. As a result, a more relaxed AC EM rule is applied during the formation of the metal segments 220, 225, 230 and 235.

Figure 5:
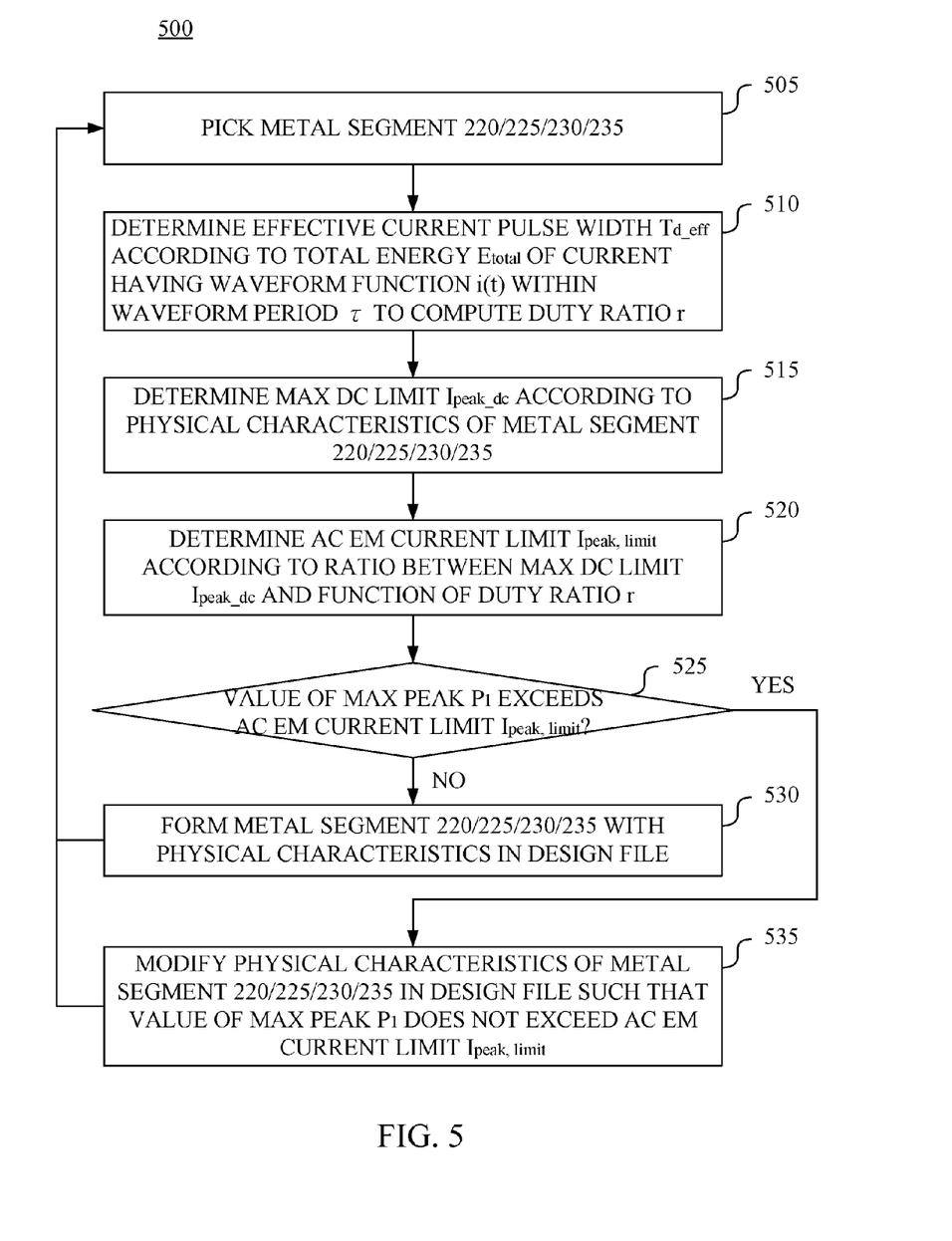
FIG. 5 is a flow chart of a method illustrating the process of forming the metal line in FIG. 2, in accordance with various embodiments of the present disclosure.

FIG. 5 is a flow chart of a method 500 illustrating the process of forming the metal line 200 in FIG. 2, in accordance with various embodiments of the present disclosure.

For illustration, the formation of the metal lines 200 in FIG. 2 is described by the method 500 with reference to FIGS. 3A-3B.

In operation 505, the metal segment 220 of the metal line 200 in at least one design file of the semiconductor device 100 is picked.

In operation 510, the effective current pulse width tD_eff of the maximum peak P1 is determined according to the total energy Etotal of the current I1 based on an integration of the waveform function i(t) over time within the waveform period $\tau$ to compute the duty ratio r.

In some embodiments, the total energy Etotal is calculated based on an integration of the square of the waveform function i(t) over time and is expressed as:

$$E_{total} = \int_0^\tau i^2(t) \cdot R \cdot dt, \text{ where } R \text{ is the resistance of the metal segment 220.}$$

The effective power Peff the relation between the maximum current amount Imax and the effective current pulse width tD_eff are found:

$$P_{eff} = \int_0^\tau i^2(t) \cdot R \cdot dt/\tau = I_{max}^2 \times R \times (\int_0^\tau (i(t)/I_{max})^2 dt/\tau)$$
$$= I_{max}^2 \times R \times (t_{D\_eff})/\tau$$

The effective current pulse width tD_eff is derived by dividing the total energy Etotal by a unit total energy under the maximum peak current value, Imax:

$$t_{D\_eff} = \int_0^\tau (i(t)/I_{max})^2 dt = (\int_0^\tau (i^2(t)) \times R \cdot dt)/I_{max}^2 \times R = (\int_0^\tau (i^2(t)) \cdot dt)/I_{max}^2$$

As illustrated above, the method is based on the conservation of the energy between the currents I1 and I2. The amount of the total energy in the current I1 that flow through the metal segment 220 is the same as the amount of the total energy in the current I2 that flow through the metal segment 220.

Therefore, when the current I1 flows through the metal segment 220, the current I1 has an effect on the metal atoms in the metal segment 220 similar to the effect generated when the current I2 flows through the metal segment 220.

The duty ratio r is further computed by dividing the effective current pulse width tD_eff by the waveform period $\tau$.

The operations 515, 520, 525, 530 and 535 are substantially the same as the operations 415, 420, 425, 430 and 435 illustrated in FIG. 4. Therefore, no further detail is discussed herein.

Further, the semiconductor device 100 is fabricated according to the at least one design file after the metal segments 220, 225, 230 and 235 are included.

Based on the operations 505-535, the metal segments 220, 225, 230 and 235 of the metal line 200 are formed according to the AC EM current limit Ipeak, limit. The AC EM current limit Ipeak, limit is calculated by dividing maximum direct current limit Ipeak_dc by the function of the duty ratio instead of using the maximum direct current limit Ipeak_dc directly. The duty ratio is determined based on the effective current pulse width tD_eff derived according to the conservation of the energy. The AC EM current limit Ipeak, limit reflects the practical effect of the current on the metal segments 220, 225, 230 and 235. As a result, a more relaxed AC EM rule is applied during the formation of the metal segments 220, 225, 230 and 235.

Figure 6:
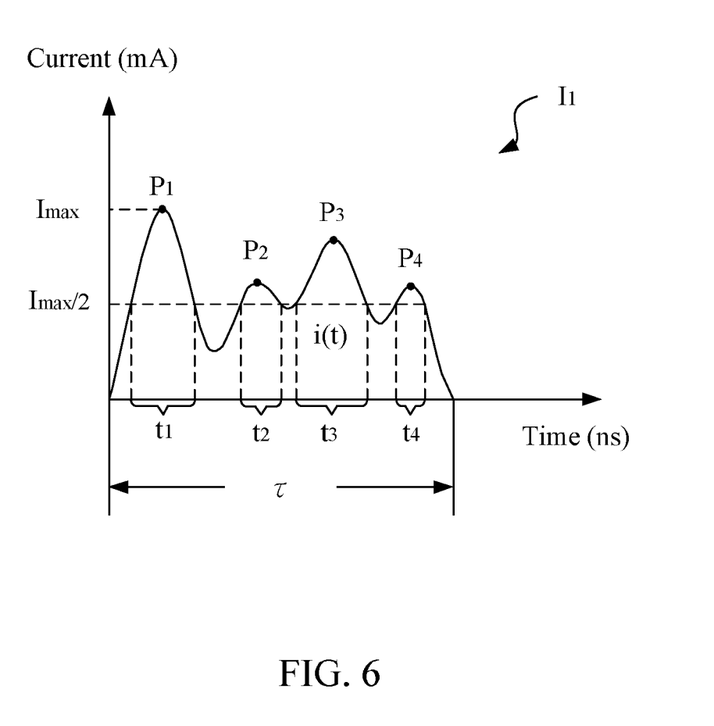
FIG. 6 is an exemplary diagram of the waveform of current that flows through the metal segment in accordance with various embodiments of the present disclosure.

FIG. 6 is an exemplary diagram of the waveform of current I1 that flows through the metal segment 220 in accordance with various embodiments of the present disclosure. The waveform of the current I1 illustrated in FIG. 6 is substantially the same as the waveform of current I1 illustrated in FIG. 3A. In FIG. 6, the time periods t1, t2, t3 and t4 that the values in the waveform function of the current I1 exceed the threshold value Imax/2 are further illustrated.

Figure 7:
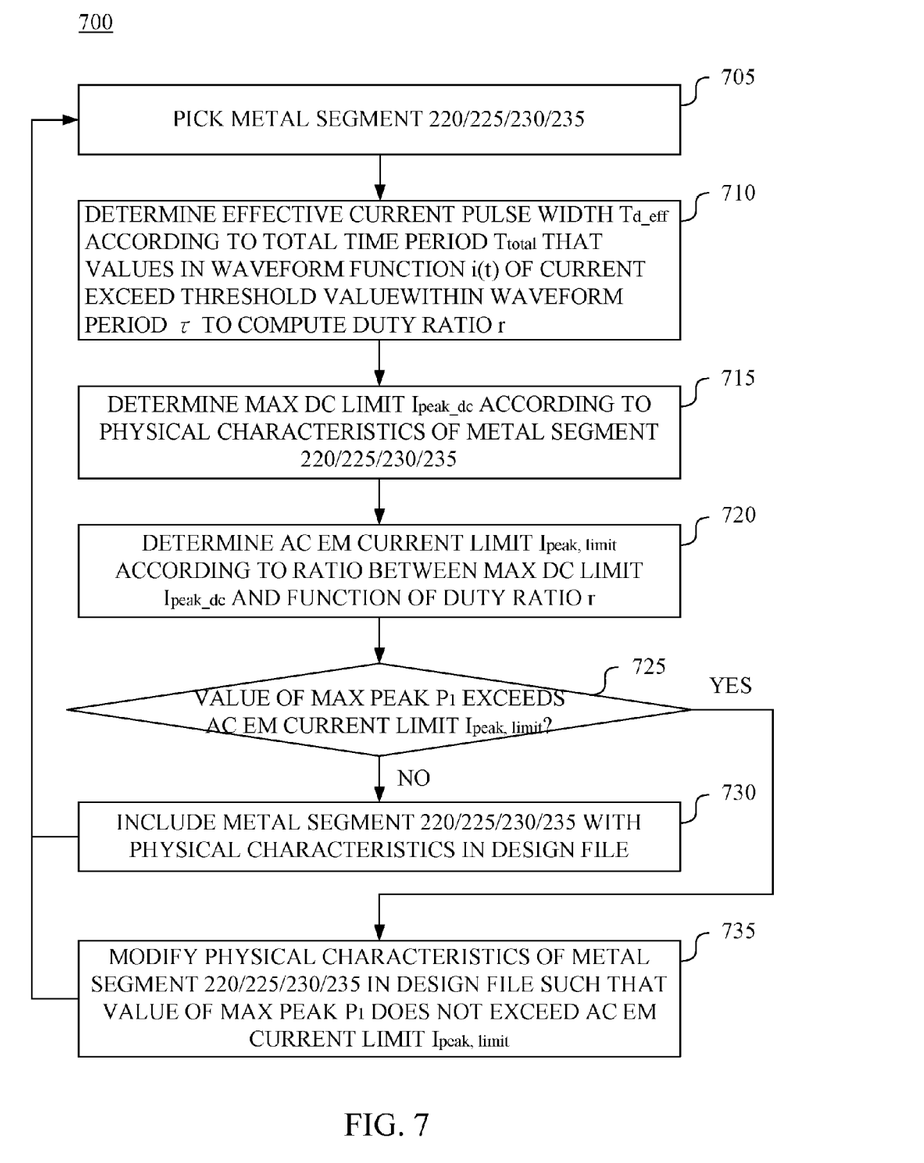
FIG. 7 is a flow chart of a method illustrating the process of forming the metal line in FIG. 2, in accordance with various embodiments of the present disclosure.

FIG. 7 is a flow chart of a method 700 illustrating the process of forming the metal line 200 in FIG. 2, in accordance with various embodiments of the present disclosure.

For illustration, the formation of the metal lines 200 in FIG. 2 is described by the method 700 with reference to FIG. 6.

In operation 705, the metal segment 220 of the metal line 200 in at least one design file of the semiconductor device 100 is picked.

In operation 710, the effective current pulse width tD_eff of the maximum peak P1 is determined according to a total time period Ttotal that the values in the waveform function of the current I1 exceed a threshold value within the waveform period $\tau$ to compute the duty ratio r.

In some embodiments, the threshold value is substantially the half of the maximum current amount Imax that is corresponding to the maximum peak P1, i.e. Imax/2. The total time period Ttotal that the values in the waveform function of the current I1 exceed the threshold value Imax/2 is t1+t2+t3+t4, as illustrated in FIG. 6. Therefore, the effective current pulse width tD_eff is determined to be:

$$t_{D\_eff} = T\text{total} = t1+t2+t3+t4$$

As illustrated above, the method is based on the parts of the current I1 that exceed the threshold value Imax/2 and have the chance to damage the metal segment 220 to obtain the effective current pulse width tD_eff.

The duty ratio r is further computed by dividing the effective current pulse width tD_eff by the waveform period $\tau$.

The operations 715, 720, 725, 730 and 735 are substantially the same as the operations 415, 420, 425, 430 and 435 illustrated in FIG. 4. Therefore, no further detail is discussed herein.

Further, the semiconductor device 100 is fabricated according to the at least one design file after the metal segments 220, 225, 230 and 235 are included.

Based on the operations 705-735, the metal segments 220, 225, 230 and 235 of the metal line 200 are formed according to the AC EM current limit Ipeak, limit. The AC EM current limit Ipeak, limit is calculated by dividing maximum direct current limit Ipeak_dc by the function of the duty ratio instead of using the maximum direct current limit Ipeak_dc directly. The duty ratio is determined based on the parts of the current I1 having the current amounts that exceed the threshold value Imax/2. The AC EM current limit Ipeak, limit reflects the approximate effect of the current on the metal segments 220, 225, 230 and 235. As a result, a more relaxed AC EM rule is applied during the formation of the metal segments 220, 225, 230 and 235.

Figure 8:
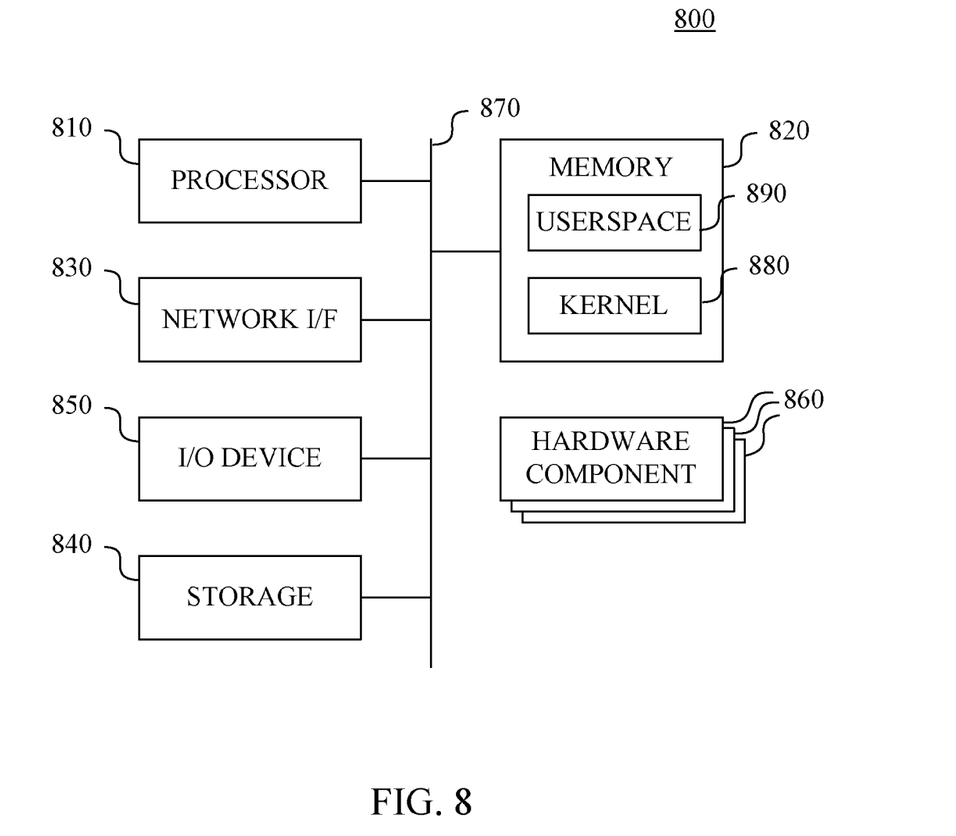
FIG. 8 is a block diagram of a computer system in accordance with some embodiments of the present disclosure.

FIG. 8 is a block diagram of a computer system 800 in accordance with some embodiments. One or more of the tools and/or systems and/or operations described with respect to FIGS. 1-7 is realized in some embodiments by one or more computer systems 800 of FIG. 8. The computer system 800 includes a processor 810, a memory 820, a network interface (I/F) 830, a storage 840, an input/output (I/O) device 850, and one or more hardware components 860 communicatively coupled via a bus 870 or other interconnection communication mechanism.

The memory 820 comprises, in some embodiments, a random access memory (RAM) and/or other dynamic storage device and/or read only memory (ROM) and/or other static storage device, coupled to the bus 870 for storing data and/or instructions to be executed by the processor 810, e.g., kernel 880, userspace 890, portions of the kernel and/or the userspace, and components thereof. The memory 820 is also used, in some embodiments, for storing temporary variables or other intermediate information during execution of instructions to be executed by the processor 810.

In some embodiments, a storage 840, such as a magnetic disk or optical disk, is coupled to the bus 870 for storing data and/or instructions, e.g., kernel 880, userspace 890, etc. The I/O device 850 includes an input device, an output device and/or a combined input/output device for enabling user interaction with the computer system 800. An input device comprises, for example, a keyboard, keypad, mouse, trackball, trackpad, and/or cursor direction keys for communicating information and commands to the processor 810. An output device comprises, for example, a display, a printer, a voice synthesizer, etc. for communicating information to a user.

In some embodiments, one or more operations and/or functionality of the tools and/or systems described with respect to FIGS. 1-8 are realized by the processor 810, which is programmed for performing such operations and/or functionality. One or more of the memory 820, the I/F 830, the storage 840, the I/O device 850, the hardware components 860, and the bus 870 is/are operable to receive instructions, data, design rules, netlists, layouts, models and/or other parameters for processing by the processor 810.

In some embodiments, one or more of the operations and/or functionality of the tools and/or systems described with respect to FIGS. 1-8 is/are implemented by specifically configured hardware (e.g., by one or more application specific integrated circuits or ASIC(s)) which is/are included) separate from or in lieu of the processor 810. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The selection of the threshold value described above is for illustrative purposes. Various threshold values are within the contemplated scope of the present disclosure.

In some embodiments, a method is disclosed that includes the operations outlined below. An effective current pulse width of a maximum peak is determined based on a waveform function of a current having multiple peaks within a waveform period in a metal segment of a metal line in at least one design file of a semiconductor device to compute a duty ratio between the effective current pulse width and the waveform period. A maximum direct current limit of the metal segment is determined according to a geometry and a type of the metal segment. An alternating current electromigration (AC EM) current limit is determined according to a ratio between the maximum direct current limit and a function of the duty ratio. The metal segment is included with the physical characteristics in the at least one design file when the maximum peak of the current does not exceed the AC EM current limit.

Also disclosed is a method that includes the operations outlined below. A metal segment of a metal line in at least one design file of a semiconductor device is picked, wherein the metal segment has a maximum direct current limit. An effective current pulse width of a maximum peak is determined based on a waveform function of a current having multiple peaks within a waveform period in the metal segment. An AC EM current limit is determined according to a ratio between the maximum direct current limit and a function of the duty ratio. One of the subsequent steps is performed: (a) The metal segment is included with the maximum direct current limit in the at least one design file when the maximum peak of the current does not exceed the AC EM current limit; (b) Physical characteristics of the metal segment in the at least one design file are modified when the maximum peak of the current exceeds the AC EM current limit such that the maximum peak of the current does not exceed the AC EM current limit.

Also disclosed is a non-transitory computer-readable medium. The non-transitory computer-readable medium contains therein instructions which, when executed by a processor of a computer system, cause the processor to execute a method that includes the operations outlined below. An effective current pulse width of a maximum peak is determined based on a waveform function of a current having multiple peaks within a waveform period in a metal segment of a metal line in at least one design file of a semiconductor device to compute a duty ratio between the effective current pulse width and the waveform period. A maximum direct current limit of the metal segment is determined according to a geometry and a type of the metal segment. An alternating current electromigration (AC EM) current limit is determined according to a ratio between the maximum direct current limit and a function of the duty ratio. The metal segment is included with the physical characteristics in the at least one design file when the maximum peak of the current does not exceed the AC EM current limit.

In this document, the term "connected" may be termed as "electrically connected", and the term "coupled" may be termed as "electrically coupled". "Connected" and "coupled" may also be used to indicate that two or more elements cooperate or interact with each other.

The number and configuration of metal layers and the metal lines in this document are for illustrative purposes. Various numbers and configurations of the metal layers and metal lines are within the contemplated scope of the present disclosure.

The above illustrations include exemplary operations, but the operations are not necessarily performed in the order shown. Operations may be added, replaced, changed order, and/or eliminated as appropriate, in accordance with the spirit and scope of various embodiments of the present disclosure.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A method comprising:
    determining an effective current pulse width of a maximum peak based on a waveform function of a current having multiple peaks within a waveform period in a metal segment of a metal line in at least one design file of a semiconductor device to compute a duty ratio between the effective current pulse width and the waveform period;
    determining a maximum direct current limit of the metal segment according to physical characteristics of the metal segment;
    determining an alternating current electromigration (AC EM) current limit according to a ratio between the maximum direct current limit and a function of the duty ratio;
    including the metal segment with the physical characteristics in the at least one design file when the maximum peak of the current does not exceed the AC EM current limit; and
    fabricating the semiconductor device according to the at least one design file.

2. The method of claim 1, wherein determining the effective current pulse width comprises:
    determining a total charge of the current based on an integration of the waveform function of the current over time; and
    dividing the total charge by a value of the maximum peak of the current to obtain the effective current pulse width.

3. The method of claim 1, wherein determining the effective current pulse width comprises:
    determining a total energy of the current based on an integration of the square of the waveform function of the current over time; and
    dividing the total energy by a unit total energy under the maximum peak of the current to obtain the effective current pulse width.

4. The method of claim 1, wherein determining the effective current pulse width comprises:
    determining a total time period that values in the waveform function of the current exceed a threshold value to obtain the effective current pulse width.

5. The method of claim 1, wherein the physical characteristics of the metal segment comprise a geometry and a type of the metal segment, and the geometry of the metal segment comprises a width and a length of the metal segment.

6. The method of claim 1, wherein the AC EM current limit is determined according to the ratio between the maximum direct current limit and a power function of the duty ratio.

7. The method of claim 1, wherein the waveform period is determined based on an operating frequency of a circuitry that the metal line connects.

8. A method comprising:
    picking a metal segment of a metal line in at least one design file of a semiconductor device, wherein the metal segment has a maximum direct current limit;
    determining an effective current pulse width of a maximum peak based on a waveform function of a current having multiple peaks within a waveform period in the metal segment;
    determining an alternating current electromigration (AC EM) current limit according to a ratio between the maximum direct current limit and a function of the duty ratio;
    performing one of:
        (a) including the metal segment with the maximum direct current limit in the at least one design file when the maximum peak of the current does not exceed the AC EM current limit; or
        (b) modifying physical characteristics of the metal segment in the at least one design file when the maximum peak of the current exceeds the AC EM current limit such that the maximum peak of the current does not exceed the AC EM current limit; and
    fabricating the semiconductor device according to the at least one design file.

9. The method of claim 8, wherein determining the effective current pulse width comprises:
    determining a total charge of the current based on an integration of the waveform function of the current over time; and
    dividing the total charge by a value of the maximum peak of the current to obtain the effective current pulse width.

10. The method of claim 8, wherein determining the effective current pulse width comprises:
    determining a total energy of the current based on an integration of the square of the waveform function of the current over time; and
    dividing the total energy by a unit total energy under the maximum peak to obtain the effective current pulse width.

11. The method of claim 8, wherein determining the effective current pulse width comprises:
    determining a total time period that values in the waveform function of the current exceed a threshold value to obtain the effective current pulse width.

12. The method of claim 8, wherein the physically characteristics of the metal segment a geometry and a type of the metal segment, and the geometry of the metal segment comprises a width and a length of the metal segment.

13. The method of claim 8, wherein the AC EM current limit is determined according to the ratio between the maximum direct current limit and a power function of the duty ratio.

14. The method of claim 8, wherein the waveform period is determined based on an operating frequency of a circuitry that the metal line connects.

15. A non-transitory computer-readable medium containing therein instructions which, when executed by a processor of a computer system, cause the processor to execute a method comprising:
    picking a metal segment of a metal line in at least one design file of a semiconductor device, wherein the metal segment has a maximum direct current limit;

determining an effective current pulse width of a maximum peak based on a waveform function of a current having multiple peaks within a waveform period in the metal segment;

determining an alternating current electromigration (AC EM) current limit according to a ratio between the maximum direct current limit and a function of the duty ratio;

performing one of:

(a) including the metal segment with the maximum direct current limit in the at least one design file when the maximum peak of the current does not exceed the AC EM current limit; or (b) modifying physical characteristics of the metal segment in the at least one design file when the maximum peak of the current exceeds the AC EM current limit such that the maximum peak of the current does not exceed the AC EM current limit; and fabricating the semiconductor device according to the at least one design file.

16. The non-transitory computer-readable medium of claim 15, wherein determining the effective current pulse width comprises:

determining a total charge of the current based on an integration of the waveform function of the current over time; and dividing the total charge by a value of the maximum peak of the current to obtain the effective current pulse width.

17. The non-transitory computer-readable medium of claim 15, wherein determining the effective current pulse width comprises:

determining a total energy of the current based on an integration of the square of the waveform function of the current over time; and dividing the total energy by a unit total energy under the maximum peak to obtain the effective current pulse width.

18. The non-transitory computer-readable medium of claim 15, wherein determining the effective current pulse width comprises:

determining a total time period that values in the waveform function of the current exceed a threshold value to obtain the effective current pulse width.

19. The non-transitory computer-readable medium of claim 15, wherein the physically characteristics of the metal segment a geometry and a type of the metal segment, and the geometry of the metal segment comprises a width and a length of the metal segment.

20. The non-transitory computer-readable medium of claim 15, wherein the AC EM current limit is determined according to the ratio between the maximum direct current limit and a power function of the duty ratio.

21. The non-transitory computer-readable medium of claim 15, wherein the waveform period is determined based on an operating frequency of a circuitry that the metal line connects.

* * * * *